V. TEDESCHI & A. G. ROSSI.
ELECTRICAL RELAY.
APPLICATION FILED JULY 29, 1915.
1,289,574.
Patented Dec. 31, 1918.
3 SHEETS—SHEET 3.
Fig. 8
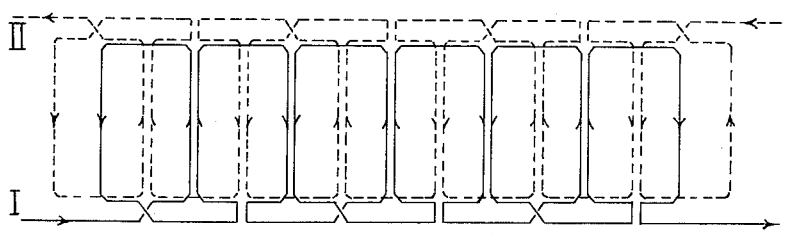
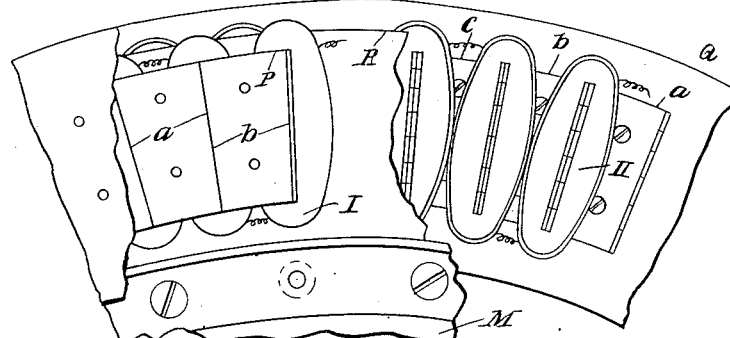
Fig. 10.
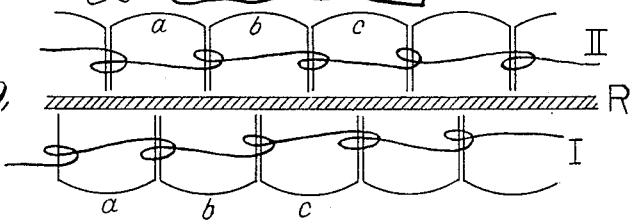
Fig. 9.
Fig. 11.
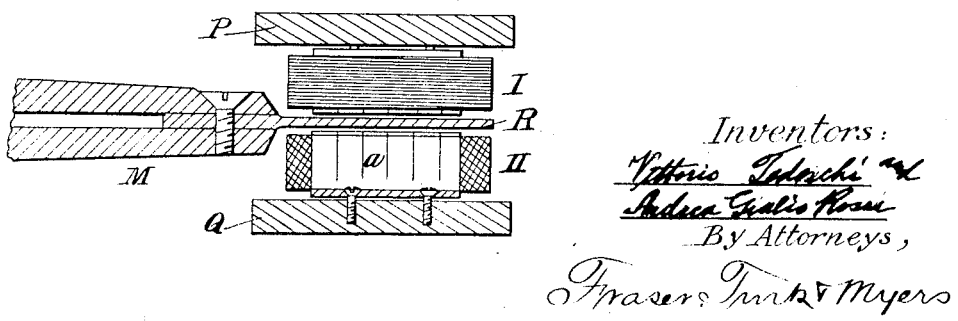
Inventors:
Vittorio Tedeschi
Andrea Giulio Rossi
By Attorneys,
Frasers Trask & Myers

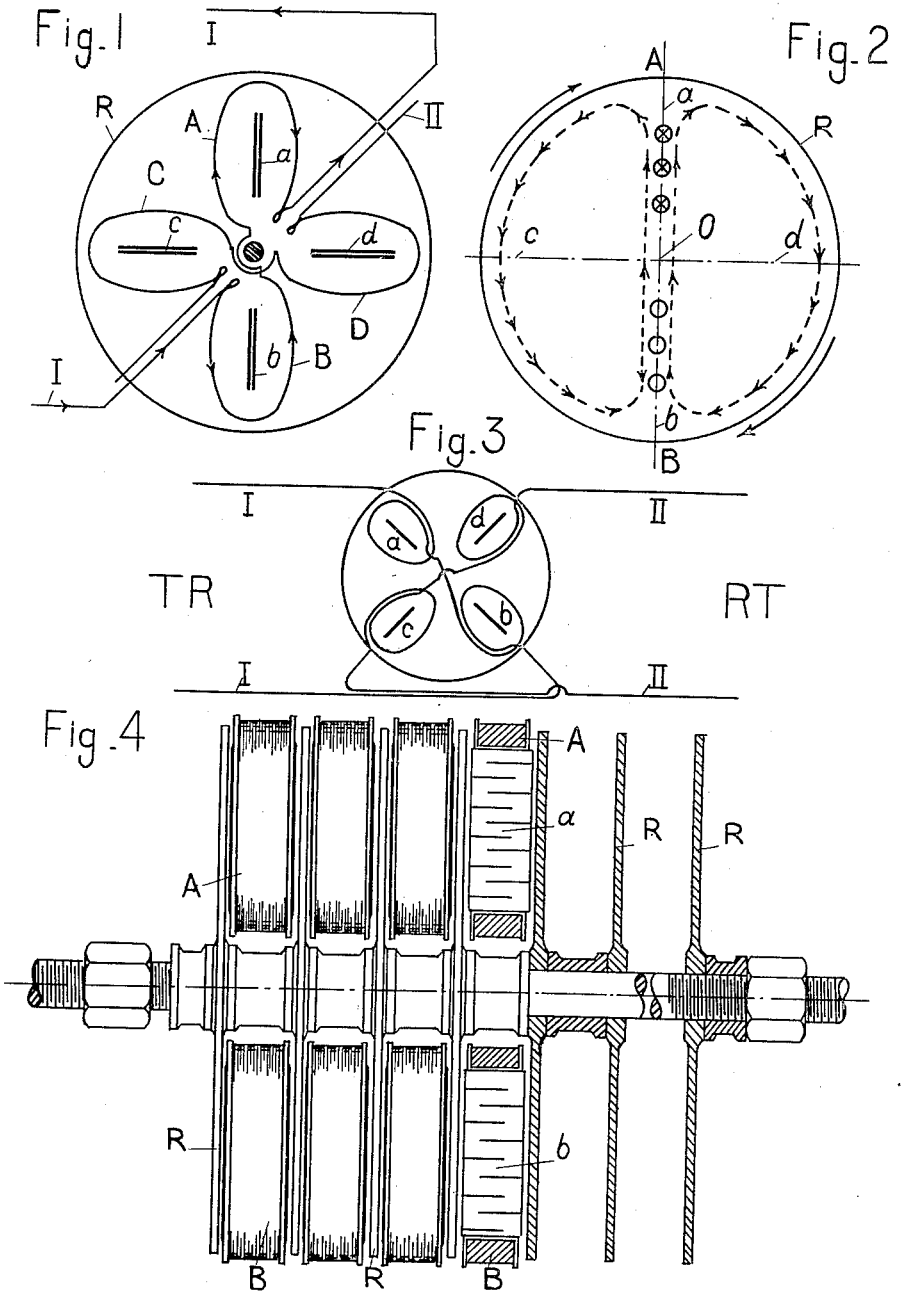

UNITED STATES PATENT OFFICE.

VITTORIO TEDESCHI AND ANDREA GIULIO ROSSI, OF TURIN, ITALY.

ELECTRICAL RELAY.

1,289,574.  Specification of Letters Patent.  Patented Dec. 31, 1918.

Application filed July 29, 1915. Serial No. 42,560.

*To all whom it may concern:*

Be it known that we, VITTORIO TEDESCHI, engineer, and ANDREA GIULIO ROSSI, professor, subjects of the King of Italy, residing at Turin, Italy, have invented certain new and useful Improvements in or Relating to Electrical Relays, of which the following is a full, clear, and exact specification.

This invention relates to an apparatus for amplifying the intensity of small periodic currents such as telephonic currents, based upon the dynamo-electric principle according to which it is possible, by an expenditure of mechanical energy, to produce electric energy from an electro-magnetic excitation, irrespective of the intensity of the latter.

The apparatus under consideration is characterized, however, by the absence of friction brushes or any kind of commutator, and, moreover, by the fact that it does not generate any current having a frequency different from that of the current which it is desired to reproduce in amplified manner.

The said apparatus consists broadly of two stationary windings, one the inductor and the other the armature, perfectly identical and symmetrical so that either may be used indifferently as the primary or secondary element; the apparatus also comprises a rotary element constituted by a metallic member having a high conductivity, of homogeneous and continuous character, which is rotated in any manner at a constant speed by means of an external force.

Figures 1 and 2 are diagrammatic views illustrating the principles of the invention;

Fig. 3 is a diagrammatic view illustrating the invention embodied as a telephonic relay;

Fig. 4 is a longitudinal view (partly in section and with the coils in the plane at right angles to coils illustrated omitted) of a rotor and certain of the stator parts;

Figs. 8 and 9 are diagrammatic views illustrating a multipolar construction.

Figs. 10 and 11 are an elevation (with parts broken away) and a cross-section, respectively, of an embodiment of a multipolar construction such as is diagrammatically represented in Figs. 8 and 9.

Figure 5:
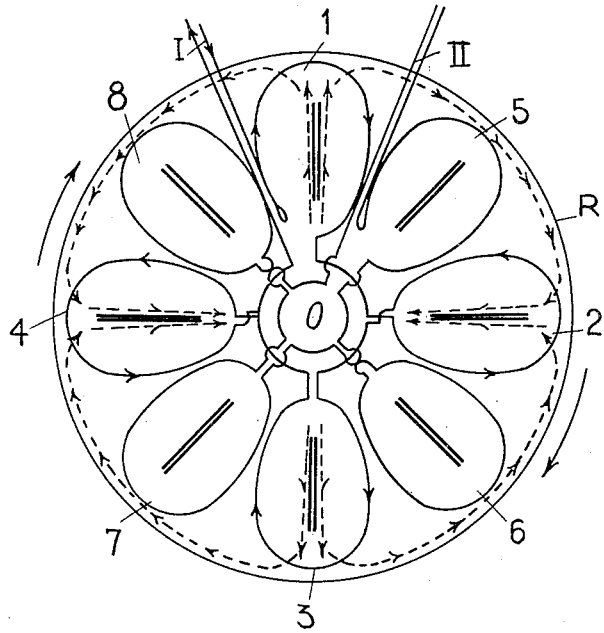
Figs. 5 and 6 are diagrammatic views illustrating the application of multiple coils.

The fundamental principle underlying the invention may be explained with the aid of Fig. 1 which illustrates diagrammatically the device or apparatus hereinbefore referred to, in its practical constructional form.

The rotor is constituted by a smooth and continuous disk R of electrolytic copper. At a small distance from either face of the disk, two systems of coils are provided, wound parallel to the disk, upon laminated soft iron cores which have their greatest length in the direction of the radii of the rotary disk.

Fig. 1 illustrates the path of these windings, A, B, C, D, in front of one of the faces of the disk R; on the other face thereof an identical system may be provided by displacing that which is seen on the front of the drawing to the rear of the same and connecting in series the co-axial coils in order to produce concordant magnetic effects through the said disk. It is sufficient, however, to consider merely the windings in front of one face of the disk, as seen in Fig. 1.

In Fig. 1, $a$, $b$, $c$, $d$, are the sections of four laminated soft iron cores on which the coils A, B, C, D, are wound. The coils A and B are connected in series in such a manner that they produce through the disk opposite fluxes when they are traversed by a current. The coils C and D are connected in a similar manner.

The system of two pairs of coils A, B and C, D, is externally symmetrical with respect to the two orthogonal planes AB, CD, or to two planes at 45 degrees. One of the pairs of coils is the primary while the other pair is the secondary, and form part of two distinct and insulated circuits I and II.

When a periodical current traverses one of the windings, for instance A, B, a statically induced current is produced in the intermediate disk, which circulates around the axes of the coils A and B parallel to their convolutions but the magnetic flux resulting through the said disk, not being connected with the convolutions of the coils D, C, no current will be produced in the latter.

There is no definite static mutual induction between the two windings.

But if the disk is rotated, for instance, in the direction indicated by the arrow in Fig. 2, a dynamic electromotive force will be produced in the direction of the diameter BA, the disk, when rotating, cutting through the primary flux. A diametral current BA is therefore produced which is closed by distributing itself into shunt circuits in both the right and left halves of the disk, along certain lines similar to *adb*, *acb*, indicated in Fig. 2.

This induced current in the disk, has a periodic form similar to that of the primary current (A, B) maintains a constant distribution in the space during the time the homogeneous disk rotates and has an intensity which is an increasing function of the speed of the disk.

The magnetic flux of the two induced circuits *adba*, *acba*, exists in a plane normal to the disk, the path of which is *cd* (Fig. 2) and it traverses the plane of the disk, in opposite directions, in the central regions of the radii O*c*, O*d*. The second pair of coils, C, D (Fig. 1) the cores of which are located in the plane *cd* are linked to the maximum extent, with the flux of the current induced upon the disk and therefore it recovers, by induction, the major portion of the energy. The secondary winding CD will therefore be traversed by a periodic current similar to that which excites the primary winding AB, with an increasing intensity in proportion to the speed of the rotor.

Owing to the perfect symmetry of both windings, irrespective of the direction of rotation of the disk, the system operates in quite a reversible manner between two circuits which comprise the windings AB and CD insulated from each other; that is to say if the winding CD is traversed by a primary periodic current, AB will operate as a secondary winding.

For the application of this apparatus in telephonic relays, the line TR (Fig. 3) coming from the station is closed upon one of the windings, for instance AB, and the line which leads to the station RT is closed upon the second winding CD. The apparatus operates in both directions in a perfectly reversible manner as soon as the disk rotates at a suitable speed, without necessitating any kind of commutation.

The factor of multiplication of this telephonic relay depends upon the product of the surface of the disk by the number of revolutions it performs.

As mechanical requirements tend to limit the speed of rotation when the radius of the rotor is increased, it is therefore convenient to construct the apparatus with a plurality of small rotary disks, rather than use a single disk having a large diameter.

A multiple apparatus may be thus constructed, composed of nine copper disks (diameter 110 mms. thickness 1.5 mms.), secured at equal distances (13 mms.) upon a common shaft, to which a continuous current motor imparts movement through the medium of friction wheels, up to 6000 revolutions per minute. Between the nine rotary disks, eight groups of windings are provided, each one being constituted by two couples, primary and secondary, as has been described hereinbefore.

Fig. 4 illustrates a central section taken in the plane of the soft iron cores, of a diametral series of coils AB between the disks R. The other series CD is in a plane at right angles thereto.

In this multiple apparatus, it is possible to connect in series or in parallel all primary windings and connect in a similar manner all secondary windings, or mixed connections can be effected partly in series partly in parallel. The combination will be governed by the electric conditions of the lines and of the transmitting and receiving apparatus.

On the same principle, it will be possible to construct advantageously another kind of multiple apparatus, by combining each winding, primary or secondary, with a greater number of induced coils, with one simple rotor. In order to obtain a better utilization of the surface of the rotating copper element, it is obviously advisable to multiply by two, or generally speaking, by 2*n*, the number of coils which constitute each winding, primary or secondary, while still preserving all the original features of symmetry of the system and all its properties.

Fig. 5 illustrates a diagram of a double primary secondary winding, with four coils for each one. The successive coils of each winding are connected in series in the periperal order so as to produce alternately fluxes of opposite direction, through the disk. The series of primary coils is 1, 2, 3, 4; the series of secondary coils is 5, 6, 7, 8. For instance, the coils 1, 3 produce a flux in a certain direction, while the coils 2, 4 produce fluxes in the opposite direction. In this manner each winding comprises a tetrapolar system instead of the bipolar system comprised in the system illustrated in Fig. 1.

Owing to the rotation of the disk in front of the first winding excited by a periodic current, four radial currents are produced in the mass, in the directions 01, 20, 03, 40, alternately centrifugal and centripetal. These currents are closed in the center and form at the periphery four identical circuits according to the profile of the corresponding quadrants. The magnetic fluxes of these induced current circuits, which remain stationary in space during the time the disk rotates, coincide with the magnetic axes of the coils of the second winding 5, 6, 7, 8, which recovers the energy of these induced currents, as in the preceding case.

Figure 6:
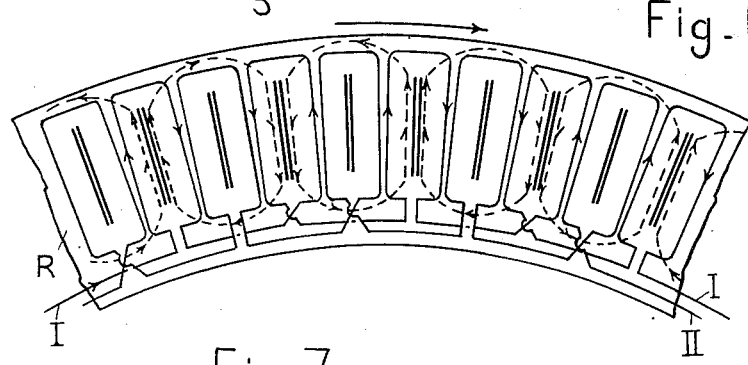

If now the number of couples of coils which constitute each winding, is gradually increased for constructional reasons, the rotating copper will be gradually reduced to a circular peripheral rim (Fig. 6). Moreover, by increasing the number of coil couples and by gradually reducing the width in the tangential direction, the advantage is obtained that the corresponding width of the circuits induced upon the rotor, is also decreased. The consequence is that the importance of the shunt currents in the rotating circular band within the peripheral paths of the sectors induced by the rotation, is also decreased and hence there is a better electromagnetic connection with the secondary coils which surround these sectors.

In this manner the most suitable form of the apparatus is obtained, by constituting the rotor of two circular identical rims (Fig. 7), parallel to each other and made of homogenous copper, carried upon the periphery of a wheel having a large radius. Between the faces of these copper rims, the said system of two stationary windings, is interposed, each of which is composed of a great number (2N) of small radial coils, wound upon the soft iron cores conveniently laminated and surrounding a good portion of the width of the rim.

Fig. 6 illustrates a diagram of connection of these two windings, which is not very different from that of an armature of a two-phase multipolar alternator.

Figure 7:
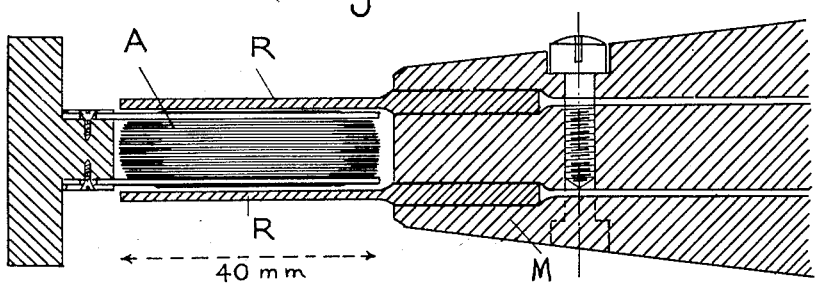
Fig. 7 illustrates a form of construction of the rotor and stator parts.

Fig. 7 illustrates a central section of this multipolar machine. RR are the two circular copper rims, carried by a wheel M made of non-magnetic material. A is one of the coils of the two windings.

This construction may also be carried into effect in a multiple manner, that is to say with, 2, 3 ... n circular copper rims upon the same felly, and 1, 2 ... (n - 1) orders of double interposed windings, identical with those described hereinbefore.

In quite an analogous manner, use may finally be made for the same purpose, of two windings, arranged as shown in Fig. 8, constituted by two series of equal coils, I and II, alternately inverted and disposed one on one side, the other on the other side with respect to a rotating copper rim.

The coils of each series are angularly displaced by a quarter of the pitch with respect to those of the other series so that the two systems will never have a mutual induction when the rotor is stationary, and each coil of one system will be subjected to the maximum inductive action of the induced currents upon the rotor owing to its rotation in the field of the coils of the other system.

In the latter arrangement, each coil of the two series I and II is wound upon a laminated soft iron core as indicated in Fig. 9 in diagrammatic section; each U-shaped core connects a pair of coils wound in opposite directions so as to close the magnetic circuits one portion of which is virtually closed in the copper of the rotor R.

In Figs. 10 and 11 an elevation and a section are shown of the device. The iron cores of a U-form, a, b, carrying the two series of windings I and II, are fixed on the circular crowns P, Q, of insulating material, and these to the metallic case of the machine; R is the rotating copper, carried by the wheel M of a non-magnetic material.

All the described devices are characterized by magnetic circuits having a great reluctance. In the multiple model of Fig. 4, the iron cores a, b, constituting the excited portion of the magnetic circuit, as well of the primary as of the secondary, are very short and separated one from the other by air gaps where the disks R rotate. Said disposition has the purpose of increasing the reciprocal induction between the whole of the stators and the rotating copper and to reinforce the magnetic flux cut by the latter. By subdividing, however, the whole of the iron core into a number of short portions, the rapid variations in the magnetization are facilitated. In a similar manner, the multipolar models shown in Figs. 6 and 7 (two rotating disks including in the gap a stator formed by two insulating series of windings alternately wound in opposite directions) and in Figs. 8, 9, 10 and 11 (showing one rotating disk comprised between the polar faces of two multipolar stators displaced by a quarter of the pitch) are characterized by magnetic circuits of a great reluctance, that is, largely open in air.

The analytical theory of the above machine, as developed by one of the inventors (A. G. Rossi, in *Transactions of the Royal Academy of Science in Turin*, vol. 51, 1915-1916), shows that the apparatus is equivalent to a special transformer without mutual static induction between the two windings, in which the motion of the rotor produces a mutual induction which increases proportionally with the speed. In other words, the equations of the apparatus have the same form as would have the equation corresponding to a static transformer having the possibility of obtaining an indefinite increase of the mutual induction from zero. This dynamic transformer possesses consequently, besides the property of any static transformer, new general characters.

For the special purpose of repeating and amplifying a telephonic current, as covered by the present patent application, it is necessary that in the construction of the apparatus a minimum of iron be employed and that this metal be distributed in a great number of very short and suitably divided cores, not only in order to avoid loss, but to make the variation in the magnetic fluxes more faithful in their amplitude and phase to the variation in the primary telephonic current. Furthermore, the necessity of limiting as far as possible "armature reaction" suggests the use of very short iron cores and of magnetic circuits much opened across the rotating copper disk.

Our dynamo-electric relay is, therefore, characterized by two identical multipolar windings, wound on laminated soft iron cores very short and forming two distinct stators, displaced, one as to the other angularly, a quarter of a pitch, the polar faces of which act from opposite sides on a disk rotor, either simple or multiple, of homogeneous copper having a high conductivity.

What we claim is:

1. A telephonic dynamo-electric relay, comprising a disk rotor and two identical multipolar windings, displaced one as to the other by a quarter of the pitch, constituting the stator, characterized by laminated soft iron cores which are very short, whereby the magnetic circuits have a great reluctance.

2. A telephonic dynamo-electric relay, comprising a rotor disk, two identical multipolar windings belonging to two distinct circuits, a primary and a secondary, two separated stators on which said windings are wound, made of laminated soft iron, displaced by a quarter of the pitch, as to each other, having the polar ends, respectively, in front of each face of the rotor disk, so that by the rotation of the latter, both stationary windings have the greatest interlinking with the fields of the currents dynamically induced on the rotor by the fluxes of the other winding.

3. A telephonic dynamo-electric relay, comprising a rotary circular rim in homogeneous copper and two identical multipolar stationary windings, angularly displaced by a quarter of the pitch, facing with their polar faces one on one side, the other on the other side, of the rotary disk, the coils of each winding being at the rear end connected in couples by means of laminated soft iron U-shaped cores.

4. A telephonic dynamo-electric relay, comprising (2N+1) rotary disks, parallel and equidistant, solidarily mounted on the same shaft, N systems of multipolar primary windings and N identical systems of secondary windings, interposed alternately between said disks, each group of systems angularly displaced by a quarter of the pitch as to the other group of systems, having short, laminated, soft iron cores providing magnetic circuits having a great reluctance.

In witness whereof, we have hereunto signed our names in the presence of two subscribing witnesses.

VITTORIO TEDESCHI.
ANDREA GIULIO ROSSI.

Witnesses:
 FELICE BAZETTA,
 COLVINA L. PEYLES.